United States Patent
Yun

(10) Patent No.: US 8,108,565 B2
(45) Date of Patent: Jan. 31, 2012

(54) HOST APPARATUS CONNECTED TO IMAGE FORMING APPARATUS, REMOTE CONFIGURATION SYSTEM INCLUDING THE SAME AND REMOTE CONFIGURATION METHOD USING HOST APPARATUS

(75) Inventor: Eun-kyung Yun, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 100 days.

(21) Appl. No.: 12/544,355

(22) Filed: Aug. 20, 2009

(65) Prior Publication Data

US 2010/0121987 A1    May 13, 2010

(30) Foreign Application Priority Data

Nov. 13, 2008  (KR) ........................ 10-2008-0112827

(51) Int. Cl.
G06F 3/00    (2006.01)
(52) U.S. Cl. ............ 710/8; 709/220; 709/221; 709/222; 717/168; 717/178
(58) Field of Classification Search ........................ None
See application file for complete search history.

(56) References Cited

U.S. PATENT DOCUMENTS

| | | | | |
|---|---|---|---|---|
| 5,619,716 | A * | 4/1997 | Nonaka et al. | 717/167 |
| 6,349,304 | B1 * | 2/2002 | Boldt et al. | 1/1 |
| 2009/0249215 | A1 * | 10/2009 | Paek | 715/740 |

OTHER PUBLICATIONS

Anonymous, "Automatic Fleet Configuration of Complex Marking Peripherals", Sep. 24, 2007, pp. 1-3.*

* cited by examiner

*Primary Examiner* — Eron J Sorrell
(74) *Attorney, Agent, or Firm* — Staas & Halsey LLP

(57) ABSTRACT

A host apparatus connected to an image forming apparatus, a remote configuration system including the same, and a remote configuration method using the host apparatus. The method of remotely configuring a host apparatus connectable to at least one image forming apparatus includes selecting the at least one image forming apparatus; configuring at least one configuration item of the at least one image forming apparatus; and displaying the at least one configured configuration item on a work list window. With this, a work list window displaying configured configuration item is prepared and it is thus convenient for a user to grasp the configured configuration item at a glance.

18 Claims, 4 Drawing Sheets

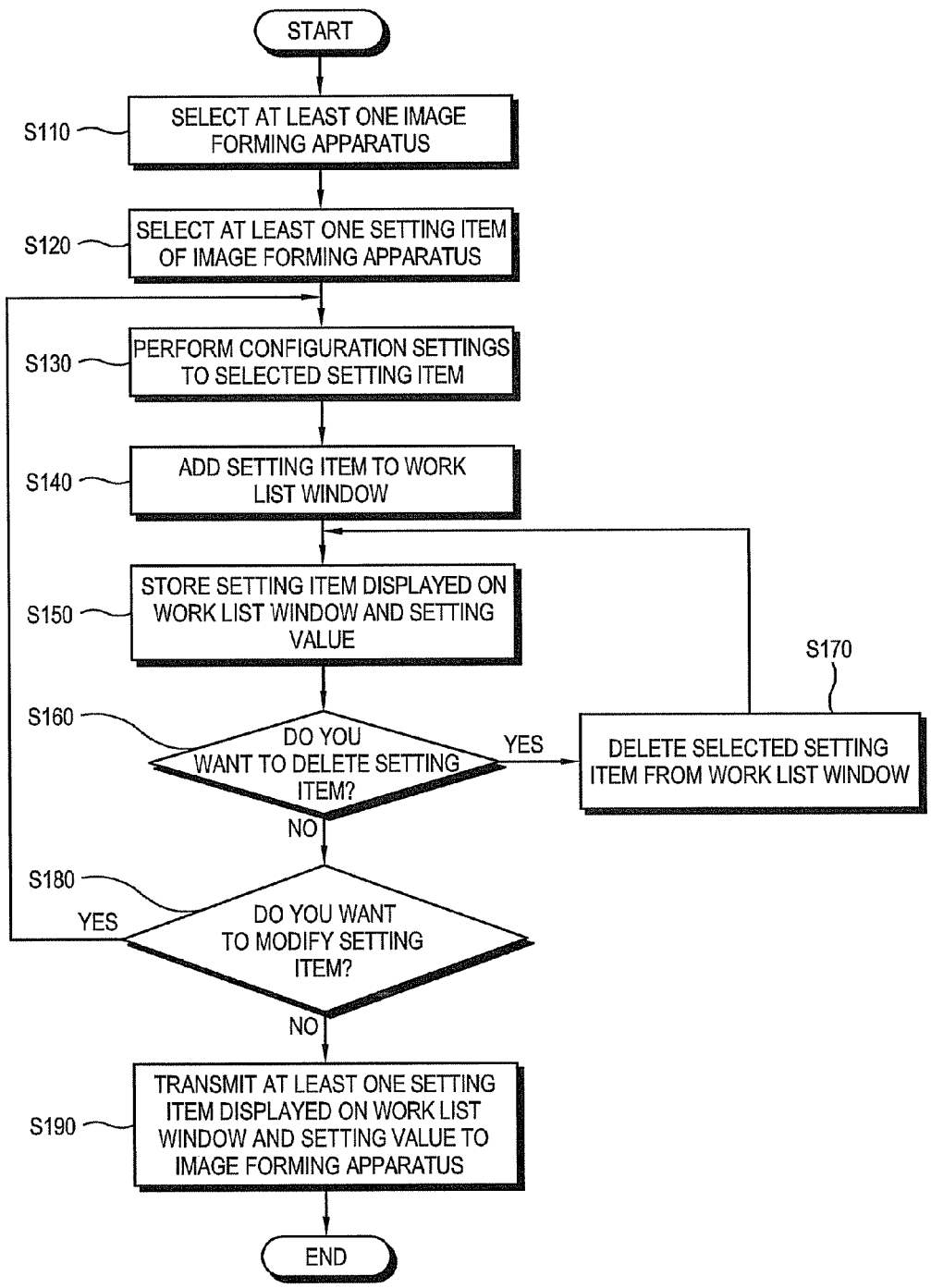

HOST APPARATUS CONNECTED TO IMAGE FORMING APPARATUS, REMOTE CONFIGURATION SYSTEM INCLUDING THE SAME AND REMOTE CONFIGURATION METHOD USING HOST APPARATUS

CROSS-REFERENCE TO RELATED APPLICATION

This application claims the benefit of Korean Application No. 10-2008-0112827, filed Nov. 13, 2008, in the Korean Intellectual Property Office, the disclosure of which is incorporated herein by reference.

BACKGROUND OF THE INVENTION

1. Field of the Invention

Apparatuses and methods consistent with aspects of the present invention relate to a host apparatus connected to an image forming apparatus, a remote configuration system including the same, and a remote configuration method using the host apparatus, and more particularly, to a host apparatus connected to an image forming apparatus and that remotely performs configuration with respect to at least one connectable image forming apparatus, a remote configuration system including the same, and a remote configuration method using the host apparatus.

2. Description of the Related Art

An image forming apparatus forms an image to be printed on paper. The image forming apparatus may include a printer, a copying machine, a facsimile, a multi-function peripheral having two or more functions, or other such apparatuses.

Recently, a demand for an office automation system in which the image forming apparatus performs the functions of the scanner, the facsimile, etc. as well as a function of printing a document like a multi-function peripheral has been on the rise. Accordingly, the image forming apparatus has been gradually developed to have higher performance, thereby extending its effective functions.

To provide convenience in configuring various functions, a user (or an administrator) may be allowed to remotely access at least one image forming apparatus through a host apparatus such as a personal computer (PC) and set the configuration thereof.

In a conventional remote configuration system, a user selects configuration items of the image forming apparatus to be set while accessing the image forming apparatus, inputs configuration values according to the selected configuration items, and sends the input configuration values to the image forming apparatus. Thus, to configure a plurality of configuration items, a user has to select the configuration items and input the configuration values separately.

Likewise, to check or modify the configuration items previously configured by a user, a user has to select the relevant configuration item again and check or modify the configuration item repetitively.

However, as the functions of the image forming apparatus are extended and thus the configuration items become complicated and various, it is difficult for a user to remember all the configuration items previously set by the user, and consequently a certain configuration item may not be configured by mistake or may be configured in error. In this case, since the relevant configuration item does not normally operate, an inconvenience for the user may occur.

Further, when there is a need to modify the previously configured configuration due to an update or the like of the image forming apparatus, a user has to repetitively carry out the same processes of searching for and configuring the relevant configuration items one by one in order to initially configure the configuration.

SUMMARY OF THE INVENTION

Aspects of the present invention provide a host apparatus connected to an image forming apparatus, a remote configuration system including the same, and a remote configuration method using the host apparatus, in which the host apparatus capable of remotely performing configuration of the image forming apparatus provides a work list window that allows the user to view and configure configuration items at a glance.

Another aspect of the present invention provides a host apparatus connected to an image forming apparatus, a remote configuration system including the same, and a remote configuration method using the host apparatus, in which the configuration items displayed through the work list window can be deleted and modified according to a user's selection, thereby preventing time from being wastefully taken in remotely performing the configuration.

The foregoing and/or other aspects of the present invention provide a method of remotely configuring a host apparatus connectable to at least one image forming apparatus, the method including: selecting the at least one image forming apparatus; configuring at least one configuration item of the at least one image forming apparatus; and displaying the at least one configured configuration item on a work list window.

The configuring of the at least one configuration item may include selecting whether to add the at least one configuration item to the work list window. Further, the selecting whether to add the at least one configuration item to the work list window may include adding at least one of configuration options of the at least one configuration item to the work list window.

Aspects of the present invention may further include storing the configured at least one configuration item and a configuration value corresponding to the at least one configuration item. The storing the at least one configuration item may include storing a history of configuring the at least one configuration item.

Aspects of the present invention may further include transmitting the at least one configuration item displayed on the work list window and the configuration value corresponding to the at least one configuration item to at least one corresponding image forming apparatus.

Aspects of the present invention may further include deleting the at least one configuration item displayed on the work list window. The method may further include modifying the at least one configuration item displayed on the work list window.

According to another aspect of the present invention, the selecting the at least one image forming apparatus may include selecting a group involving the at least one image forming apparatus, and the configuring the at least one configuration item may include configuring the at least one configuration item of the at least one image forming apparatus involved in the selected group.

Another aspect of the present invention provides a host apparatus remotely configuring at least one image forming apparatus, the host apparatus including: a user interface for selecting the at least one image forming apparatus and configuring at least one configuration item of the selected image forming apparatus is configured; a display unit displaying a work list window for the remote configuration; and a controller controlling the display unit to display the at least one configured configuration item on the work list window.

According to another aspect of the present invention, the user may select whether to add the at least one configuration item to the work list window through the user interface. According to another aspect of the present invention, at least one of configuration options of the at least one configuration item may be added to the work list window through the user interface.

According to another aspect of the present invention the host apparatus may further include a storage unit which stores the configured at least one configuration item and a configuration value corresponding to the at least one configuration item. The storage unit may store a history of configuring the at least one configuration item.

According to another aspect of the present invention, the host apparatus may further include a communication unit which transmits the at least one configuration item displayed on the work list window and the configuration value corresponding to the at least one configuration item to the at least one corresponding image forming apparatus.

According to another aspect of the present invention, through the user interface, the at least one configuration item displayed on the work list window may be deleted. Through the user interface, the at least one configuration item displayed on the work list window may be modified.

According to another aspect of the present invention, through the user interface a group involving the at least one image forming apparatus may be selected, and the at least one configuration item of the at least one image forming apparatus involved in the selected group may be configured.

Still another aspect of the present invention provides a remote configuration system including at least one image forming apparatus and a host apparatus remotely performing configuration to the image forming apparatus, the remote configuration system including: the host apparatus, including: a first communication unit communicating with the at least one image forming apparatus, a user interface to select the at least one image forming apparatus, and to configure the at least one configuration item of the selected image forming apparatus, a display unit displaying a work list window for the remote configuration, and a first controller controlling the display unit to display the at least one configured configuration item on the work list window, and the first communication unit to transmit the configuration item displayed on the work list window and a configuration value corresponding to the configuration item to at least one corresponding image forming apparatus; and the at least one image forming apparatus including: a second communication unit communicating with the host apparatus, and a second controller controlling the configuration item according to the configuration item and the configuration value received from the host apparatus through the second communication unit.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 is a flowchart of a remote configuration method using the host apparatus according to an exemplary embodiment of the present invention.

DETAILED DESCRIPTION OF THE EMBODIMENTS

Figure 1:
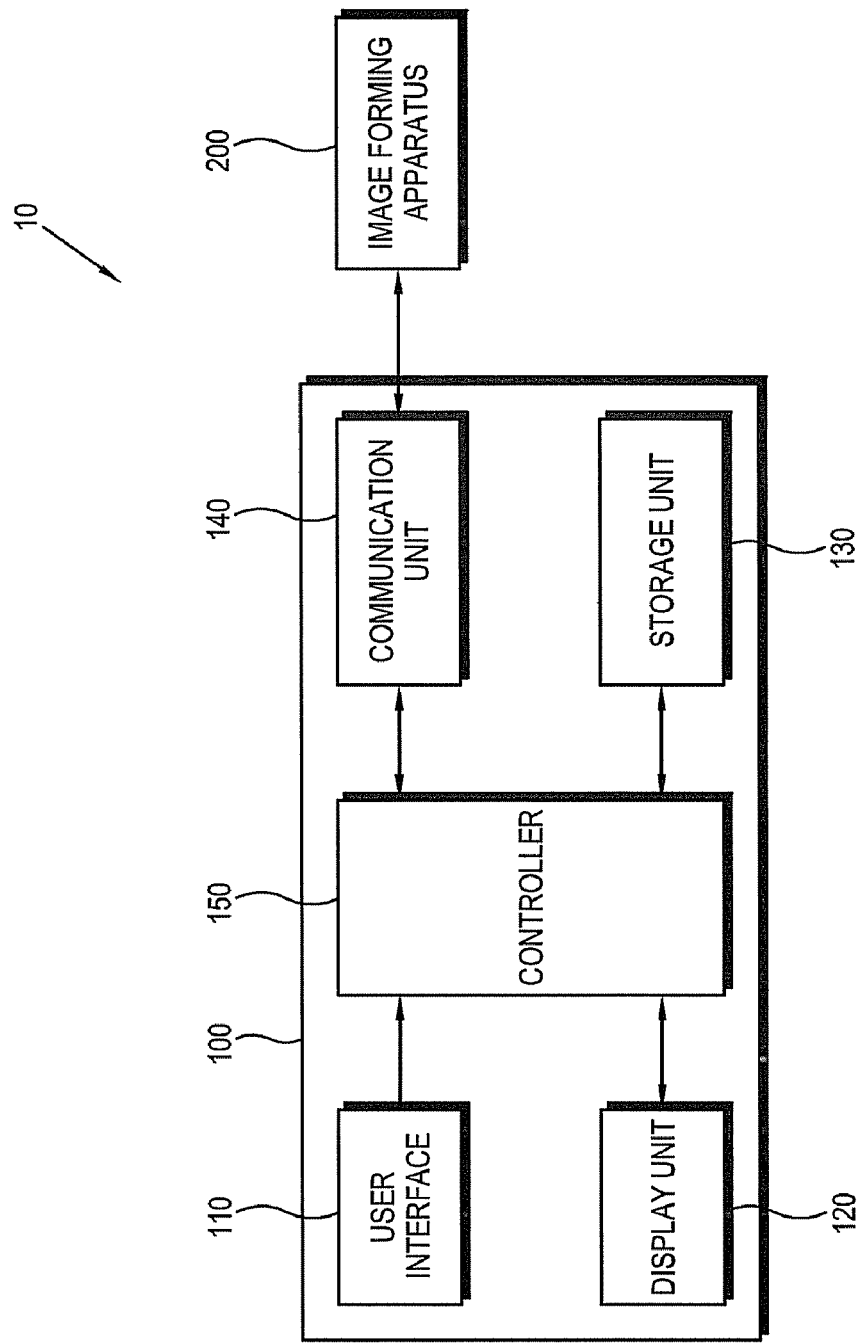
FIG. 1 is a block diagram of a host apparatus according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a host apparatus 100 according to an exemplary embodiment of the present invention.

In this embodiment, a host apparatus 100 connects with an image forming apparatus 200 via a wired and/or a wireless network, locally and remotely, and performs data communication with at least one image forming apparatus 200. Here, the host apparatus 100 may be a personal computer (PC), a server, or other similar apparatuses. Further, the image forming apparatus 200 may be a printer, a copying machine, a facsimile, a multi-function peripheral having two or more functions, or other similar devices.

As shown in FIG. 1, the host apparatus 100 includes a user interface 110, a display unit 120, a storage unit 130, a communication unit 140 and a controller 150.

The user interface 110 receives various commands from a user. Specifically, a user can input a command to remotely configure at least one configuration item to at least one image forming apparatus through the user interface 110.

To this end, the user interface 110 allows a user to input an identification (ID) and a password for log-in. The controller 150 authenticates a corresponding user based on the input ID and password. Here, a user includes an administrator.

In more detail, the host apparatus 100 may log-in the image forming apparatus 200 under an administrator mode to have authority to set and modify all configuration settings of the image forming apparatus 200. The host apparatus 100, which is logged into the image forming apparatus 200 under the administrator mode, selects the image forming apparatus 200 to be configured and remotely accesses the selected image forming apparatus 200, thereby selecting at least one configuration item of the accessed image forming apparatus 200 and inputting a configuration value of the selected configuration item. Thus, the host apparatus 100, which is logged into the image forming apparatus 200 under the administrator mode, serves as an administration server for at least one image forming apparatus 200.

Figure 2:
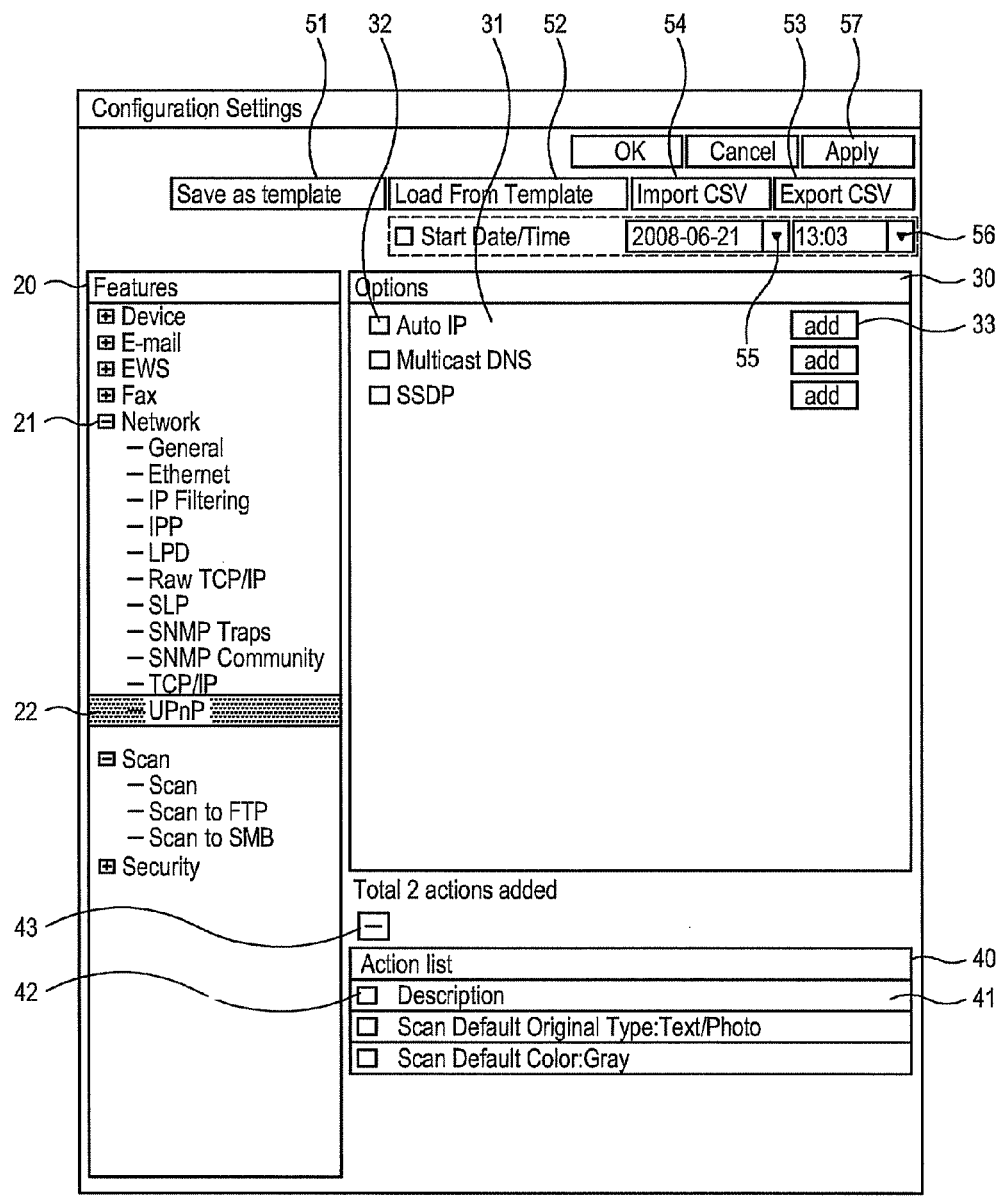
FIG. 2 shows an example screen for configuration settings according to an exemplary embodiment of the present invention.

The user interface 110 may include a keyboard, a mouse, or other similar peripheral apparatuses. provided as an input unit of the host apparatus 100, and may include a graphic user interface (GUI) generated by executing a driver or a separate application and displayed on the display unit 120 so that a user can carry out an input therethrough. For example, the user interface 110 in this embodiment may include check boxes 32 and 42, an add button 33, a delete button 43, a save button 51, a load button 52, an export button 53, an import button 54, an apply button 57, etc. (as shown in FIG. 2).

Meanwhile, the user interface 110 may configure a group involving at least one image forming apparatus 200, and uniformly configure all the configuration items of the image forming apparatuses 200 involved in the configuration group.

For example, a user may configure the image forming apparatuses 200 of the same model into one configuration group, and uniformly set all the configuration items of the plural image forming apparatuses 200 involved in the configuration group if this group is selected.

The display unit 120 shows a user a screen for displaying the configuration settings in which a list of at least one connectable image forming apparatus 200 is displayed and the configuration items for configuring a predetermined image forming apparatus 200 are displayed according to categories. A user may select one of the displayed image forming apparatuses 200 through the user interface 110, select at least one of the configuration items displayed corresponding to the selected image forming apparatus 200, and input the configuration value with regard to the selected item. Here, the configuration items may be different according to the kinds (e.g., model names) of the image forming apparatus 200. The host apparatus 100 transmits information about the selected configuration items and the corresponding configuration values to the corresponding image forming apparatus 200.

The display unit 120 may include a liquid crystal display (LCD), and a driver (not shown) to drive the LCD, or other similar display devices.

FIG. 2 shows an example screen for the configuration settings according to an exemplary embodiment of the present invention.

As shown in FIG. 2, the screen of the configuration settings for at least one image forming apparatus 200 includes a configuration item window 20 in which at least one configuration item is displayed according to categories, a work window 30 in which configuration is performed with regard to the configuration items 21 and 22 selected in the configuration item window 20, and a work list window 40 in which the configuration items set in the work window 30 are listed.

Specifically, the configuration item window 20 shows the configuration items of the image forming apparatus 200 selected through the user interface 110 in a tree structure according to upper and lower categories. Thus, if a user selects at least one upper configuration item 21 shown in the configuration item window 20 through the user interface 110, lower configuration items 22 of the selected upper configuration item 21 may be displayed. Then, a user selects one of the displayed lower configuration items 22 and sets up it. Alternatively, the upper configuration item 21 may be selected and configured as necessary.

The work window 30 displays detailed configuration items 31 to receive configuration values for the configuration items 21 and 22 selected in the configuration item window 20. The work window 30 may include the check box 32 for selecting the detailed configuration item 31 to which the configuration value has been input, and the add button 33 for adding the selected detailed configuration item 31 to the work list window 40. Thus, when the selected configuration item 31 is completely configured, a user clicks the check box 32 and the add button 33, thereby adding the corresponding configuration item 31 to the work list window 40.

According to the selected configuration items 31, the work window 30 may further include a text field to input various texts, a drop-down list in which at least one item is selectable among a plurality of items as well as the check box 32 and the add button 33.

In this embodiment, the configuration items include the upper configuration item 21, the lower configuration item 22, and the detailed configuration item 31. Also, the work window 30 shows anyone of the upper configuration item 21, the lower configuration item 22, and the detailed configuration item 31. Furthermore, according to the category of the configuration item 31 displayed in the work window 30, a user may add all configuration options involved in the corresponding configuration item 31 to the work list window 40 at once, or may add at least one configuration option to the work list window 40 selectively.

According to another exemplary embodiment of the present invention, the host apparatus 100 may automatically add a predetermined configuration item 31 to the work list window 40 without the check box 32 or the add button 33 when the corresponding configuration item 31 is completely configured. Alternatively, a user may select whether to add the configured configuration item 31 to the work list window 40.

The work list window 40 shows a user a list of configured configuration items 41. Specifically, the work list window 40 displays the configured configuration item 41, the check box 42 to select the relevant configuration item 41, and the delete button 43 to detect the configuration item 41 selected using the check box 41 from the work list window 40.

Through the work list window 40, a user can view the configured configuration items 41 at a glance and may delete or modify the previously configured configuration item 41 if necessary. For example, a user selects the check box 42 of a predetermined configuration item 41 and then selects the delete button 42 through the user interface 110, thereby deleting the corresponding configuration item 41 from the work list window 40. Also, if a user selects the configuration item 41 in the work list window 40, the selected configuration item 41 is displayed on the work window 30 and thus the user can check detailed configuration specifics of the selected configuration item 41 and modify it as necessary.

The configuration item 41 shown in the work list window 40 is stored together with the relevant configuration value in the storage unit 130. Specifically, the storage unit 130 may store the configuration item completely configured in the work window 30 and added to the work list window 40, and the configuration value corresponding to the configuration item as temporary files in a predetermined location of the storage unit 130.

Such a storing process may be achieved by automatically storing the configuration item 41 when the configuration item 41 is added to the work list window 40, or selecting the save button 51 provided on the screen for the configuration settings, as shown in FIG. 2, as necessary. Also, a user may configure the configuration item 31 displayed in the work window 30 by selecting the load button 52 on the screen for the configuration settings and loading a previously-stored temporary file. Here, the save button 51 is used for storing the configuration item previously configured in the image forming apparatus 200 as a temporary file, and the load button 52 is used for reading the configuration value from one image forming apparatus 200 and loading the configuration item stored as the temporary file.

Referring to FIG. 2, the configuration screen may be provided with the export button 53 to convert and store the stored temporary file into a predetermined format (e.g., comma separated value (CSV), Excel (XLS), etc.) and export the converted file. The import button 54 may be provided to import a file of a predetermined format stored in another device, or on an external storage device, or storage medium, such as a flash memory or other storage device. Here, a CSV file may contain identification information of the image forming apparatus 200 such as an IP address. Thus, a user may use the export button 53 or the import button 54 to uniformly send or load all the configuration items of the plural image forming apparatuses even though the plural image forming apparatuses are different with respect to the identification information.

In addition, the storage unit 130 may store a history of configuring the configuration items. Thus, if a user selects a configuration date 55 and a configuration time 56, the display unit 120 displays the configuration item 31 stored corresponding to a selected point of time through the work window 30. Then, a user selects the displayed configuration item 31 and checks or modifies the configuration specifics thereof if necessary.

The storage unit 130 may include an internal storage medium such as a hard disk drive (HDD), or an external or portable storage medium such as a universal serial bus (USB) memory and a memory card (a memory stick, a compact flash (CF) card and a multimedia card (MMC)) or other similar storage medium.

The communication unit 140 performs wired and/or wireless communication with at least one image forming apparatus 200. Specifically, the communication unit 140 transmits the configuration item 41 displayed on the work window 40 and the relevant configuration value to the corresponding image forming apparatus 200 if a user selects the apply button 57 on the screen for the configuration settings in the state that at least one configuration item is completely configured.

The communication unit 140 may include a wired and/or a wireless communication module to which the image forming apparatus 200 is connectable locally or through a network based on a predetermined protocol (e.g., simple network management protocol (SNMP), or other similar network management protocol), a USB port to which the portable storage medium such as the USB memory is connectable, and so on.

Meanwhile, the host apparatus 100 may automatically transmit the configuration value corresponding to the configured configuration item to the relevant image forming apparatus 200 regardless of a user's selection.

The controller 150 performs general control of the host apparatus 100. Specifically, the controller 150 controls the display unit 120 to display at least one configured configuration item on the work list window 40 if the configuration is performed with regard to at least one configuration item of at least one image forming apparatus 200. Here, the controller 150 may add the relevant configuration item 31 to the work list window 40 if the add button 33 of the work window 30 is selected by a user, or may automatically add the configured configuration item 31 to the work list window 40 regardless of a user's selection.

The controller 150 may control the storage unit 130 to store the configuration item added to the work list window 41 and the configuration value corresponding to the configuration item. Here, the storage unit 140 may store the configuration item displayed on the work list window 41 and the configuration value corresponding thereto as temporary files, or may store them in a designated location of the storage unit 130 as a file of a predetermined format such as a CSV or the like according to a user's selection. Further, the storage unit 130 may additionally store the history of configuring the configuration items.

The controller 150 transmits the stored configuration item and configuration value to the corresponding image forming apparatus 200. Here, the controller 150 transmits the configuration item and the configuration value to the image forming apparatus 200 according to a user's selection, or stores the configuration item as a temporary file in the storage unit 130 and transmits it to the corresponding image forming apparatus 200 when sensing that the configuration item is added to the work list window 40 regardless of the user's selection.

Also, the controller 150 may transmit the configuration item and the corresponding configuration value stored in the storage unit 140 to the image forming apparatus 200 according to predetermined periods or randomly.

The foregoing host apparatus 100, according to an exemplary embodiment of the present invention, may connect with at least one image forming apparatus 200-1, 200-2, . . . , 200-n to be configured, thereby forming a remote configuration system 10, as illustrated in FIG. 1.

Figure 3:
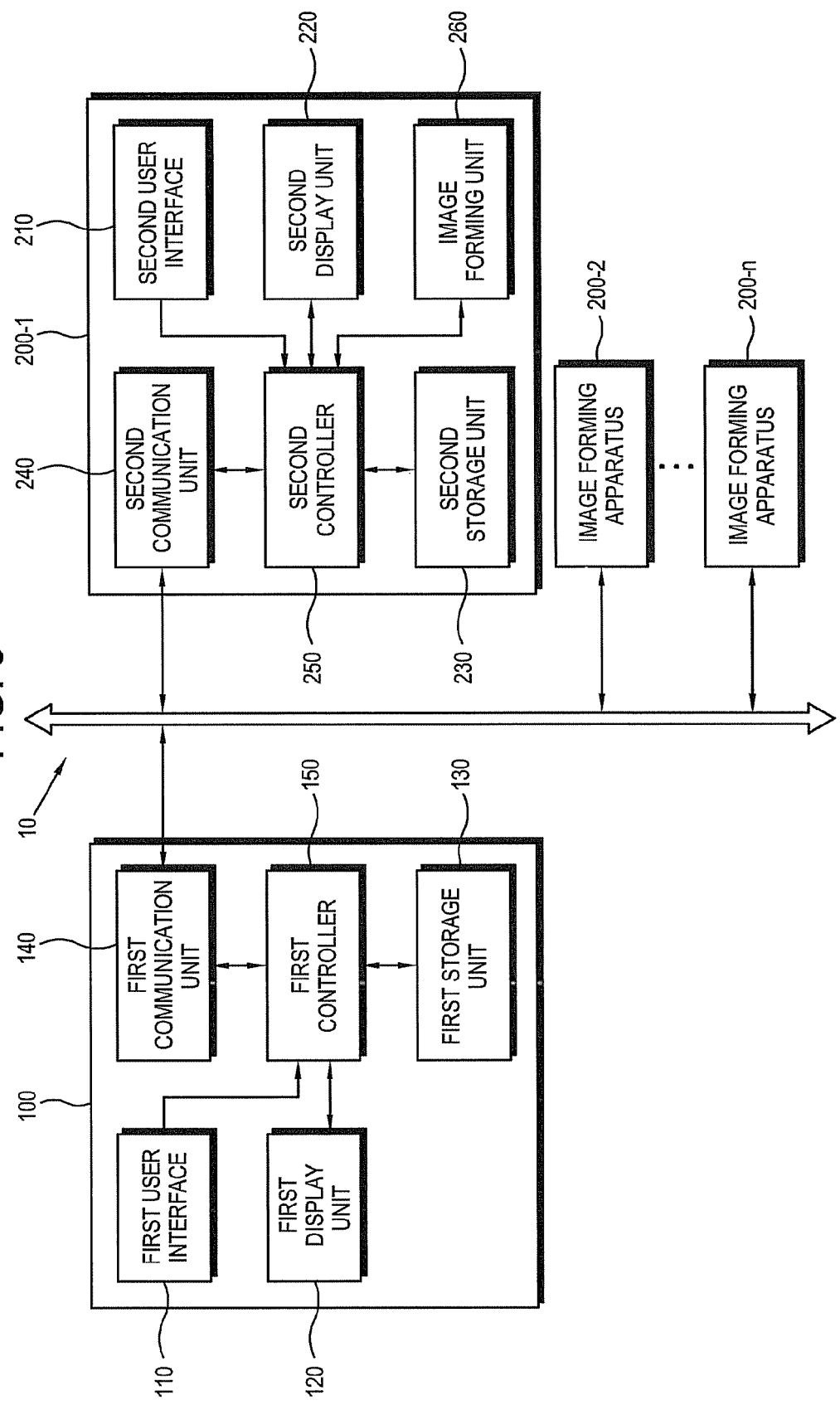
FIG. 3 is a block diagram of a remote configuration system according to an exemplary embodiment of the present invention.

FIG. 3 is a block diagram of a remote configuration system 10 including the host apparatus 100 and at least one image forming apparatus 200-1, 200-2, . . . , 200-n according to an exemplary embodiment of the present invention.

As shown in FIG. 3, the remote configuration system 10 may include the host apparatus 100 and the plurality of image forming apparatuses 200-1, 200-2, . . . , 200-n.

The host apparatus 100 may be a PC, a server (i.e., an administration server), or other similar devices, and each of the image forming apparatuses 200-1, 200-2, . . . , 200-n may be a printer, a multi-function peripheral having two or more functions, or other similar devices or a combination thereof, which are connectable to a network. Here, a program or a driver distributed by the manufacturer of the image forming apparatus may be installed and executed in the host apparatus 100 as an application or software for managing the image forming apparatus 200-1, 200-2, . . . , 200-n connectable to the host apparatus 100.

The image forming apparatus 200-1 includes a second user interface 210, a second display unit 220, a second storage unit 230, a second communication unit 240 and a second controller 250. Further, the image forming apparatus 200-1 may include an image forming unit 260 to form an image in response to a command of printing. Here, the printing includes printing of an image after scanning a document, printing of received fax data, and printing of print data received from an external source through the host apparatus 100 such as a server or stored in the interior (an HDD) or the exterior (a USB memory) of the image forming apparatus 200.

Like elements having the same function refer to like reference numerals in the exemplary embodiments shown in FIGS. 1 and 3, and the descriptions of the elements may be common to the embodiments of FIGS. 1 and 3.

The host apparatus 100, in this embodiment, connects with at least one image forming apparatus 200-1, 200-2, . . . , 200-n through the first communication unit 140, and communicates with each of the image forming apparatuses 200-1, 200-2, . . . , 200-n.

The first display unit 120 displays at least one image forming apparatus 200-1, 200-2, . . . , 200-n communicating with the host apparatus 100 through the first communication unit 140 so that the image forming apparatus 200-1, 200-2, . . . , 200-n can be selected. Then, a user selects one image forming apparatus 200-1 among the displayed image forming apparatuses 200-1, 200-2, . . . , 200-n through the first user interface 110, and sets up the selected image forming apparatus 200-1.

In more detail, the first display unit 120 displays the screen for the configuration settings on which the configuration item of the selected image forming apparatus is selectable, and a user selects and sets up at least one of the displayed configuration items. Here, the configuration items displayed through the first display unit 120 may be the screen for the configuration settings shown in FIG. 2.

The first controller 150 controls the first display unit 120 to display the configured configuration item on the work list window 40 of the screen for the configuration settings, stores the configuration item displayed on the work list window 40 and the corresponding configuration value in the first storage unit 130, and transmits the stored configuration item and configuration value to the corresponding image forming apparatus 200-1 via the first communication unit 140.

Likewise, the first controller 150 remotely performs configuration with regard to other image forming apparatuses 200-2, . . . , 200-n.

The second controller 250 of the image forming apparatus 200-1, which receives the configuration item and the corresponding configuration value from the host apparatus 100, stores the received configuration item and configuration value in the second storage unit 230 and performs the configuration. Here, the image forming apparatus 200-1 performs the configuration according to a user's selection using the second user interface 210, or shows a user configuration results through the second display unit 220.

According to another exemplary embodiment of the present invention, the remote configuration system 10 may be provided with a separate administration server to store various information about at least one image forming apparatus 200-1, 200-2, . . . , 200-n and administer the image forming apparatus 200-1, 200-2, . . . , 200-n, and thus it is possible to access the separate administration server through the host apparatus 100 and perform the configuration with regard to the image forming apparatus 200-1, 200-2, . . . , 200-n. Here, the administration server may include a web server in which the information about each image forming apparatus 200-1, 200-2, . . . , 200-n is stored, and thus the host apparatus 100 accesses the web server of the administration server through log-in of a user (or an administrator) to perform the configuration of each image forming apparatus 200-1, 200-2, . . . , 200-n.

As described above, if the separate administration server is provided, the host apparatus 100 performs the configuration to the plurality of image forming apparatuses 200-1, 200-2, . . . , 200-n, stores the CSV file the identification information, the configuration item and the configuration value of the corresponding image forming apparatus 200-1, 200-2, . . . , 200-n, and transmits the stored CSV file about the plurality of image forming apparatuses 200-1, 200-2, . . . , 200-n to the administration server at once. Here, the image forming apparatuses 200-1, 200-2, . . . , 200-n may be set into one group in the CSV file, and may be different in the configuration item from one another.

In the remote configuration system 10, including the host apparatus 100, with the foregoing configurations, a remote configuration method of the host apparatus to the image forming apparatus will be described below with reference to FIG. 4.

Referring to FIG. 4, at operation S110 the host apparatus 100 selects at least one of the connectable image forming apparatuses 200-1, 200-2, . . . , 200-n through the user interface 110. Here, a user may set a group including at least one image forming apparatus 200-1, 200-2, . . . , 200-n, and select the set group.

At operation S120, the host apparatus 100 selects at least one configuration item of the image forming apparatus 200 selected in the operation S110. Here, the host apparatus 100 displays the screen for the configuration settings as shown in FIG. 2, thereby allowing the configuration item to be selected through the displayed screen.

At operation S130, the configuration is performed by inputting the configuration value of the configuration item selected in the operation S120. Here, the image forming apparatuses 200 may be different in the configuration item and the configuration value from one another.

At operation S140, the host apparatus 100 adds the configuration items configured in the operation S130 to the work list window 40 of FIG. 2.

At operation S150, the host apparatus 100 stores both the configuration item added in the operation S140 and the corresponding configuration value in the storage unit 130.

At operation S160, the host apparatus 100 may select at least one of the configuration items 41 displayed on the work list window 40 in order to delete it.

If the configuration item to be deleted is selected in the operation S160, at operation S170 the controller 150 controls the display unit 120 to delete the corresponding configuration item from the work list window 40.

At operation S180, the host apparatus 100 may select at least one of the configuration items 41 displayed on the work list window 40 in order to modify it.

If the configuration item to be modified is selected in the operation S180, the host apparatus 100 performs the configuration with respect to the configuration item on the basis of the configuration value input in the operation S130.

At operation S190, the host apparatus 100 transmits at least one configuration item displayed on the work list window 40 and the configuration value to the corresponding image forming apparatus 200.

According to an exemplary embodiment of the present invention, the host apparatus 100 separately displays the configured configuration item on the work list window 40 while remotely configuring at least one image forming apparatus 200-1, 200-2, . . . , 200-n, so that a user can view the configuration specifics and modify them, thereby decreasing an omission or an error during the configuration operations.

Meanwhile, the foregoing embodiments are described with regard to the case that the host apparatus 100 remotely sets up at least one image forming apparatuses 200-1, 200-2, . . . , 200-n, but not limited thereto. Alternatively, aspects of the present invention may be applied to not only the image forming apparatus 200-1, 200-2, . . . , 200-n but also any device (e.g., a mobile phone, a MP3 player, a navigation system, etc.) which can be remotely configured through a wire/wireless network.

As described above, aspects of the present invention provide a host apparatus connected to an image forming apparatus, a remote configuration system including the same, and a remote configuration method using the host apparatus, in which the host apparatus capable of remotely performing configuration of the image forming apparatus is convenient for a user since it provides a work list window that allows the user to view configured configuration items at a glance.

Also, the configuration items displayed through the work list window can be deleted and modified according to a user's selection, thereby preventing time from being wastefully taken in remotely performing the configuration.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of remotely configuring a host apparatus connectable to at least one image forming apparatus, the method comprising:
   selecting the at least one image forming apparatus;
   configuring at least one configuration item of the at least one image forming apparatus on a work window;
   selecting whether to add the at least one configuration item configured on the work window to a work list window;

displaying the at least one configured configuration item on the work list window; and storing the configured at least one configuration item and a configuration value corresponding to the at least one configuration item, wherein configuring at least one configuration item comprises receiving at least one configuration value for the at least one configuration item, and wherein the work window displays detailed configuration items to receive the at least one configuration value for the at least one configuration item and the work list window displays a list of the selected configuration item.

2. The method according to claim 1, wherein the selecting whether to add the at least one configuration item to the work list window comprises adding at least one of configuration options of the at least one configuration item to the work list window.

3. The method according to claim 1, wherein the storing the at least one configuration item comprises storing a history of configuring the at least one configuration item.

4. The method according to claim 1, further comprising transmitting the at least one configuration item displayed on the work list window and the configuration value corresponding to the at least one configuration item to at least one corresponding image forming apparatus.

5. The method according to claim 1, further comprising deleting the at least one configuration item displayed on the work list window.

6. The method according to claim 1, further comprising modifying the at least one configuration item displayed on the work list window.

7. The method according to claim 1, wherein the selecting the at least one image forming apparatus comprises selecting a group involving the at least one image forming apparatus, and the configuring the at least one configuration item comprises configuring the at least one configuration item of the at least one image forming apparatus involved in the selected group.

8. A host apparatus remotely configuring at least one image forming apparatus, the host apparatus comprising:

a user interface for selecting the at least one image forming apparatus and configuring at least one configuration item of the selected image forming apparatus by receiving at least one configuration value for the at least one configuration item on a work window;

a display unit displaying the work window and a work list window for the remote configuration settings;

a storage unit storing the at least one configured configuration item and a configuration value corresponding to the at least one configuration item; and a controller controlling the display unit to display the at least one configured configuration item on the work list window, wherein whether to add the at least one configuration item to the work list window is selected through the user interface, and wherein the work window displays detailed configuration items to receive the at least one configuration value for the at least one configuration item and the work list window displays a list of the selected configuration item.

9. The host apparatus according to claim 8, wherein at least one of configuration options of the at least one configuration item is added to the work list window through the user interface.

10. The host apparatus according to claim 8, wherein the storage unit stores a history of configuring the at least one configuration item.

11. The host apparatus according to claim 8, further comprising a communication unit transmitting the at least one configuration item displayed on the work list window and the configuration value corresponding to the at least one configuration item to at least one corresponding image forming apparatus to the at least one selected image forming apparatus.

12. The host apparatus according to claim 8, wherein, through the user interface, the at least one configuration item displayed on the work list window is deleted.

13. The host apparatus according to claim 8, wherein, through the user interface, the at least one configuration item displayed on the work list window is modified.

14. The host apparatus according to claim 8, wherein, through the user interface, a group involving the at least one image forming apparatus is selected, and the at least one configuration item of the at least one image forming apparatus involved in the selected group is configured.

15. A remote configuration system comprising at least one image forming apparatus and a host apparatus remotely performing configuration to the at least one image forming apparatus, the remote configuration system comprising:

the host apparatus, comprising:

a first communication unit communicating with the at least one image forming apparatus, a user interface to select the at least one image forming apparatus and to configure the at least one configuration item of the selected image forming apparatus by receiving at least one configuration value for the at least one configuration items on a work window, a display unit displaying the work window and a work list window for the remote configuration settings, and a first controller controlling the display unit to display the at least one configured configuration item on the work list window, and the first communication unit to transmit the configuration item displayed on the work list window and the at least one configuration value corresponding to the configuration item to at least one corresponding image forming apparatus; and the at least one image forming apparatus, comprising:

a second communication unit communicating with the host apparatus, and a second controller controlling the configuration item according to the configuration item and the at least one configuration value received from the host apparatus through the second communication unit, wherein whether to add the at least one configuration item to the work list window is selected through the user interface, and wherein the work window displays detailed configuration items to receive the at least one configuration value for the at least one configuration item and the work list window displays a list of the selected configuration item.

16. The host apparatus of claim 15, further comprising:

a first storage unit storing the configuration item displayed on the work list window and a configuration value corresponding to the configuration item corresponding to the to at least one corresponding image forming apparatus; and a second storage unit storing the configuration of the configuration item displayed on the work list window and a configuration value corresponding to the configuration item transmitted by the first controller.

17. A method of grouping a plurality of configuration items corresponding to a plurality of image forming apparatuses connectable to a host apparatus, the method comprising:
- detecting the plurality of the image forming apparatuses connected to the host apparatus;
- detecting the plurality of configuration items corresponding to the plurality of connected image forming apparatuses connected to the host apparatus;
- displaying the plurality of configuration items as a group on a display apparatus of the host apparatus on a work window;
- configuring at least one configuration item of the group of the plurality of configuration items in the work window;
- selecting whether to add the at least one configuration item of the group of the plurality of configuration items to a work list window; and
- displaying the plurality of configuration items on the work list window;
- wherein configuring the plurality of configuration items comprises receiving a plurality of configuration values for the plurality of configuration items, and
- wherein the work window displays detailed configuration items to receive the plurality of configuration values for the plurality of configuration items and the work list window displays a list of the selected configuration items.

18. The method according to claim 17, further comprising storing a configuration of at least one of the group of the plurality of configuration items and a configuration value corresponding to the at least one of the group of the plurality of configuration items.

* * * * *

UNITED STATES PATENT AND TRADEMARK OFFICE
CERTIFICATE OF CORRECTION

PATENT NO. : 8,108,565 B2
APPLICATION NO. : 12/544355
DATED : January 31, 2012
INVENTOR(S) : Eun-kyung Yun Page 1 of 1

It is certified that error appears in the above-identified patent and that said Letters Patent is hereby corrected as shown below:

Column 12, Line 62, In Claim 16, delete "the to" and insert -- the --, therefor.

Signed and Sealed this
Twenty-ninth Day of May, 2012

David J. Kappos
*Director of the United States Patent and Trademark Office*